United States Patent [19]

Okochi et al.

[11] Patent Number: 5,179,362
[45] Date of Patent: Jan. 12, 1993

[54] POWER LINE FILTER

[75] Inventors: Sadao Okochi, Fussa; Terutaka Takoda, Ome, both of Japan

[73] Assignee: Kabushiki Kaisha Toshiba, Kawasaki, Japan

[21] Appl. No.: 866,124

[22] Filed: Apr. 7, 1992

Related U.S. Application Data

[63] Continuation of Ser. No. 625,669, Dec. 13, 1990, abandoned.

[30] Foreign Application Priority Data

Dec. 15, 1989 [JP] Japan .................. 1-325716

[51] Int. Cl.$^5$ ............................ H03H 7/09
[52] U.S. Cl. ..................... 333/181; 333/12
[58] Field of Search ............... 333/12, 25, 181, 177, 333/185; 361/118

[56] References Cited

U.S. PATENT DOCUMENTS

| | | | |
|---|---|---|---|
| 4,428,018 | 1/1984 | Hahn | 333/177 X |
| 4,667,173 | 5/1987 | Okochi | 333/25 X |
| 4,761,623 | 8/1988 | Schneider | 333/181 X |

OTHER PUBLICATIONS

Sekri, "Power Line Filter", IBM Tech. Discl. Bulletin, vol. 17, No. 7, Dec. 1974, pp. 1998, 1999.
Hans-Werner Schulz, "Funk-Entstorung mit stromkompensierten Drosseln," Seimans-Bauteile-Informationen, 10 (1972) pp. 32-34.
Siemens, "MV Funk-Entstorung, Bauelemente, Filter," 1983/84, pp. 280-285.
Lon. M. Schneider; Noise Source Equivalent Circuit Model for Off Line Converters and Its Use in Input Filter Design; 1983 IEEE International Symposium on EMC, pp. 167-175.

Okochi, Power Supply Complying with International Regulations for Personal Computers, pp. 10-12, 1985.
Okochi et al., Analysis of Normal Mode Conducted Interference Voltage of Wide-Input-Voltage Range Off-Line Power Converters, pp. 17-23, 1988.
Okochi et al., An Optimal Conducted EMI-Reduction Scheme for Wide Input Voltage Range Off-Line Power Converters, PCIM '88 Proceedings, pp. 443-442, Dec. 1988.

Primary Examiner—Paul M. Dzierzynski
Assistant Examiner—Seung Ham
Attorney, Agent, or Firm—Cushman, Darby & Cushman

[57] ABSTRACT

A noise induced from a switching power supply source or the like is applied to a power line. The noise is classified into two kinds, one of them being normal mode noise appearing between power lines and the other one being common mode noise appearing between a power line and a ground line. Thus, a line filter is required to attenuate these noises. The present invention provides a line filter for attenuating normal mode noise appearing on a power line between a live line and a neutral line as well as common mode noise appearing between the power line and a ground line, wherein the line filter includes a plurality of first inductors interposed between the live line and the neutral line, a first X-capacitor interposed between the live line and the neutral line on the load side relative to the first inductors, a plurality of second inductors interposed between the live line and the neutral line on the load side relative to the first X-capacitor, and a Y-capacitor interposed between the live line and the ground line as well as between the neutral line and the ground line on the load side relative to the second inductors, the Y-capacitor constituting a common mode filter between the first inductors and the second inductors in response to common mode noise.

33 Claims, 6 Drawing Sheets

NOISE FREQUENCY 50KHz

NOISE FREQUENCY 100KHz

POWER LINE FILTER

This is a continuation of application Ser. No. 07/625,669, filed on Dec. 13, 1990, which was abandoned upon the filing hereof.

BACKGROUND OF THE INVENTION

1. FIELD OF THE INVENTION

The present invention relates to a line filter for attenuating common mode noise and normal mode noise generated in an electronic device including a switching power supply source or the like.

2. DESCRIPTION OF THE RELATED ART

A switching power supply source is generally designed in smaller dimensions with a light weight and operates at a high efficiency. In view of the foregoing advantages, the switching power supply source has been widely used as a power supply source for an electronic device.

However, it has been generally known that high frequency transmission noise is induced from a switching transistor, a rectifying diode, a transformer, a choke coil or the like when the switching power supply source is used as a power supply unit for an electronic device, causing the electronic device to be erroneously operated. Usually, the transmission noise is classified into two kinds. One of them is normal mode noise which flows between power lines and the other one is common mode noise which flows between a power line and a ground line.

To attenuate the normal mode noise, a normal mode line filter composed of a normal mode choke coil and a X-capacitor interposed between the power lines is usually used. Frequency characteristics and attenuating characteristics of the line filter as constructed in the above-described manner can be improved by combining a plurality of line filters of the foregoing type with each other in multistaged-structure, whereby the normal mode noise can be attenuated effectively.

On the other hand, to attenuate the common mode noise, a common mode line filter composed of a balun coil arranged on the power line and a Y-capacitor interposed between the power supply source line and an earth line is usually used. A capacity of the Y-capacitor for the common mode line filter can not be enlarged in excess of a preset value from the viewpoint of failsafe. For the reason, a balun coil is required to have a large magnitude of inductance in order to sufficiently attenuate the common mode noise. However, this leads to the result that the balun coil is unavoidably designed in larger dimensions. To obviate the foregoing problem, a proposal has been raised as one means for increasing the magnitude of inductance of the balun coil without necessity for designing the balance coil in larger dimensions such that the common mode line filter is divided into plural parts. In this case, however, there arises another problem that the common mode noise can be attenuated merely by a small quantity.

SUMMARY OF THE INVENTION

The present invention has been made with the foregoing background in mind.

An object of the present invention is to provide a line filter which assures that normal and common mode noises can be attenuated effectively.

Another object of the present invention is to provide a line filter which is designed in smaller dimensions.

To accomplish the above objects, the present invention provides a line filter which comprises a plurality of first inductors interposed between a live line and a neutral line, a first X-capacitor interposed between the live line and the neutral line on the load side relative to the first inductors, a plurality of second inductors. interposed between the live line and the neutral line on the load side relative to the first X-capacitor, and Y-capacitor interposed between the live line and the neutral line on the load side relative to the second inductors, the Y-capacitor constituting a common mode filter between the first inductors and the second inductors in response to common mode noise.

Normal mode noise is attenuated by a normal mode filter which is constructed by leakage inductance from the first and second inductors and the first X-capacitor to operate in response to the normal mode noise. Common mode noise is attenuated by a single stage type common mode filter which is constructed by the first inductors, the second inductors and the Y-capacitor.

Other objects, features and advantages will become apparent from reading of the following description which has been made in conjunction with the accompanying drawings.

BRIEF DESCRIPTION OF THE DRAWINGS

The present invention is illustrated in the following drawings in which.

DESCRIPTION OF THE PREFERRED EMBODIMENTS

Now, the present invention will be described in detail hereinafter with reference to accompanying drawings which illustrates preferred embodiments of the present invention.

Figure 1:
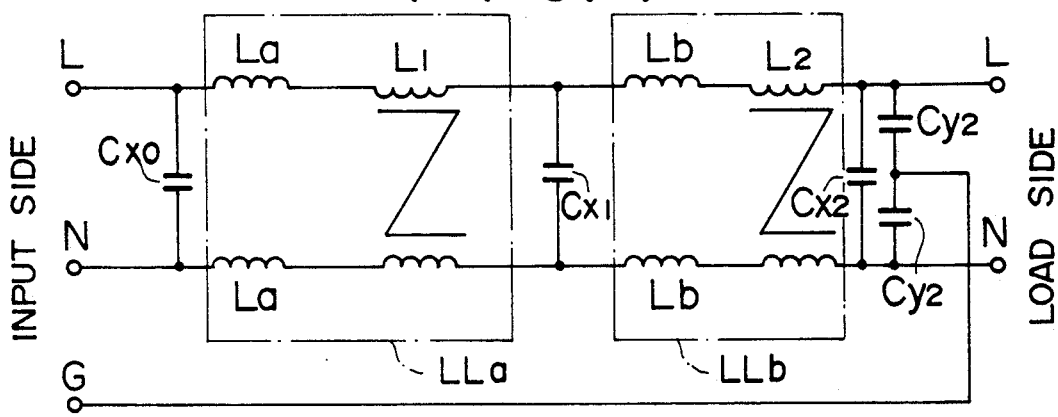
FIG. 1 is a circuit diagram which illustrates a line filter in accordance with an embodiment of the present invention.

FIG. 1 is a circuit diagram which illustrates a line filter in accordance with an embodiment of the present invention.

As shown in the drawing, the line filter extends from the input side and the load side both of which are connected to a power line, and is composed of a X-capacitor $C_{x0}$, a normal mode choke $L_a$, a balun coil L1, a X-capacitor $C_{x1}$, a normal mode choke $L_b$, a balun coil L2, a X-capacitor $C_{x2}$ and Y-capacitors $C_{y2}$. It should be noted that the balun coils L1 and L2 are constructed such that two sets of coils are wound around a ring-shaped core, respectively. In additions, the X-capacitors represents a capacitor which is interposed between a live line L and a neutral line N, respectively, while one of the Y-capacitors represents a capacitor which is interposed between the live line L and a ground line G and the other one represents a capacitor which is interposed between the neutral line N and the ground line G.

According to this embodiment, normal mode noise is attenuated by the C-L-C-L-C type line filter which is composed of the X-capacitor $C_{x0}$, the normal mode choke $L_a$, the X-capacitor $C_{x1}$, the normal mode choke $L_b$ and the X-capacitor $C_{x2}$. On the other hand, common mode noise is attenuated by the common mode filter which is composed of the balun coils L1 and L2 and the Y-capacitors $C_{y2}$.

Figure 2:
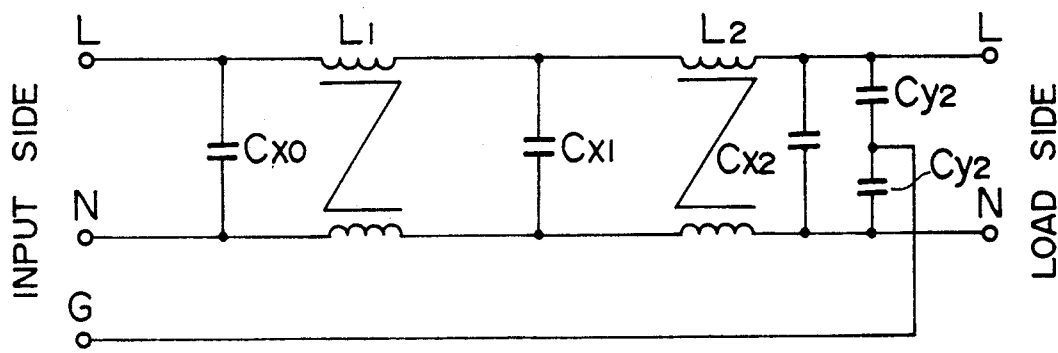
FIG. 2 is a circuit diagram which illustrates a line filter in accordance with another embodiment of the present invention.

FIG. 2 is a circuit diagram which illustrates a line filter in accordance with another embodiment of the present invention.

As shown in the drawing, the line filter of the present invention extends from the input side to the load side both of which are connected to a power line, and is composed of a X-capacitor $C_{x0}$, a balun coil L1, a X-capacitor $C_{x1}$, a balun coil L2, a X-capacitor $C_{x2}$ and Y-capacitors $C_{y2}$.

Generally, the balun coils L1 and L2 has a leakage inductance, respectively. This leakage inductance corresponds to an inductance of the normal mode choke $L_a$ shown in FIG. 1. Thus, the normal mode filter is constructed by the leakage inductance, the X-capacitor $C_{x0}$, the X-capacitor $C_{x1}$ and the X-capacitor $C_{x2}$, whereby the normal mode noise can be attenuated by the normal mode filter. On the other hand, the common mode noise is attenuated by the common mode filter which is constructed by the balun coils L1 and L2 and the Y-capacitors $C_{y2}$ in the same manner as in the case of the embodiment shown in FIG. 1.

Figure 3:
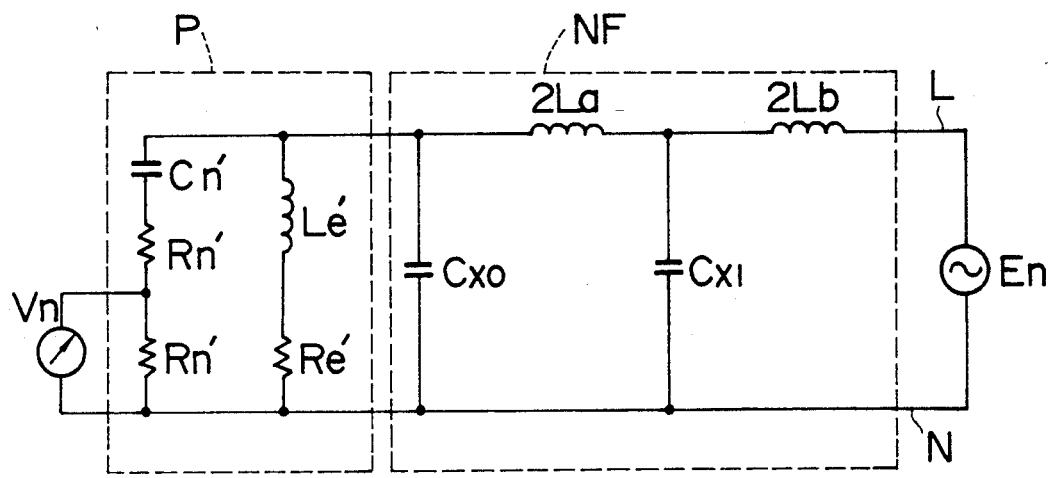
FIG. 3 is an equivalent circuit diagram in a case where the line filter of the present invention operates as a normal mode filter.

FIG. 3 is an equivalent circuit diagram which illustrates a case where the line filter shown in FIG. 1 operates to attenuate the normal mode noise.

In the drawing, reference character P designates an equivalent circuit for a power supply source. Reference characters $R_e'$ and $R_n'$ designate an equivalent resistor, respectively, reference character $C_n'$ designates an equivalent capacitance and reference character $L_e'$ designates an equivalent inductance. Reference character NF designates an equivalent circuit for the normal mode line filter. In addition, reference character $V_n$ designates a voltage of the normal noise voltage measured in the circuit for the power supply source. Further, reference character $E_n$ designates a voltage of the normal mode noise appearing on the load side.

Figure 6:
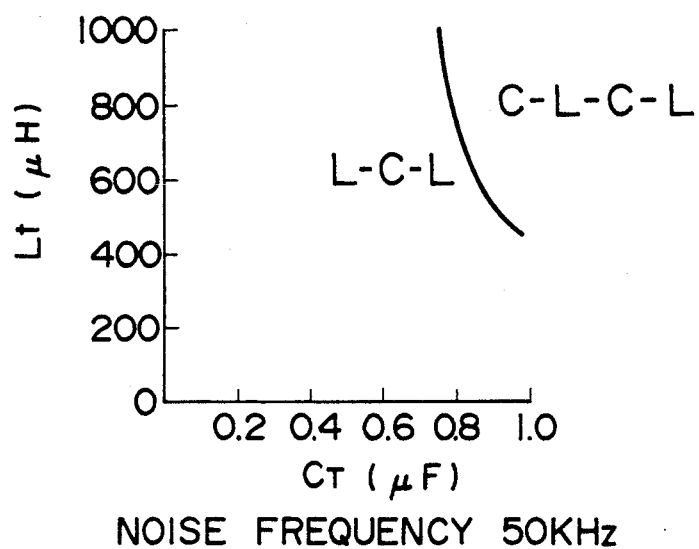
FIG. 6 is an illustrative view int he form of a characteristic curve which shows optimum filter arrangement in a case where a total quantity of inductance and a total quantity of capacitance are given with respect to the normal mode filter of which noise frequency is preset to 50 kHz.
Figure 7:
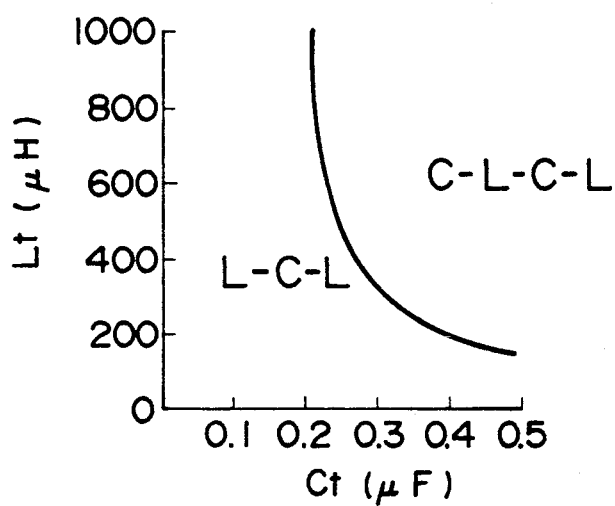
FIG. 7 is an illustrative view in the form of a characteristic curve which shows optimum filter arrangement in a case where a total quantity of inductance and a total quantity of capacitance are given with respect to the normal mode filter of which noise frequency is preset to 100 kHz.
Figure 9:
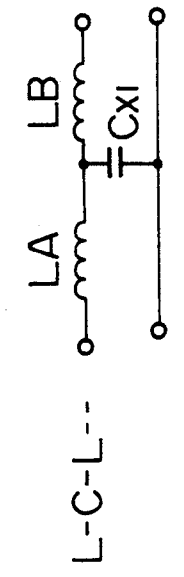
FIG. 9 is a circuit diagram which illustrate circuit arrangement of a L-C-L type normal mode filter.
Figure 8:
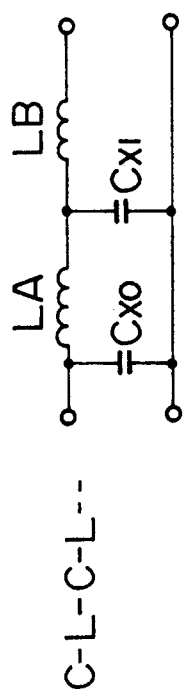
FIG. 8 is a circuit diagram which illustrates circuit arrangement of a C-L-C type normal mode filter.

Now, it is assumed that $C_{x0}+C_{x1}$ is represented $C_t$ and $L_a+L_b$ is represented by $L_t$. Then, either of structures represented by L - C - L and C - L - C is selected depending on values of $C_t$ and $L_t$, as shown in FIGS. 6 and 7. Thereafter, values of the capacitance and the inductance are determined such that the noise is attenuated in an optimum manner based on the selected structure.

Figure 4:
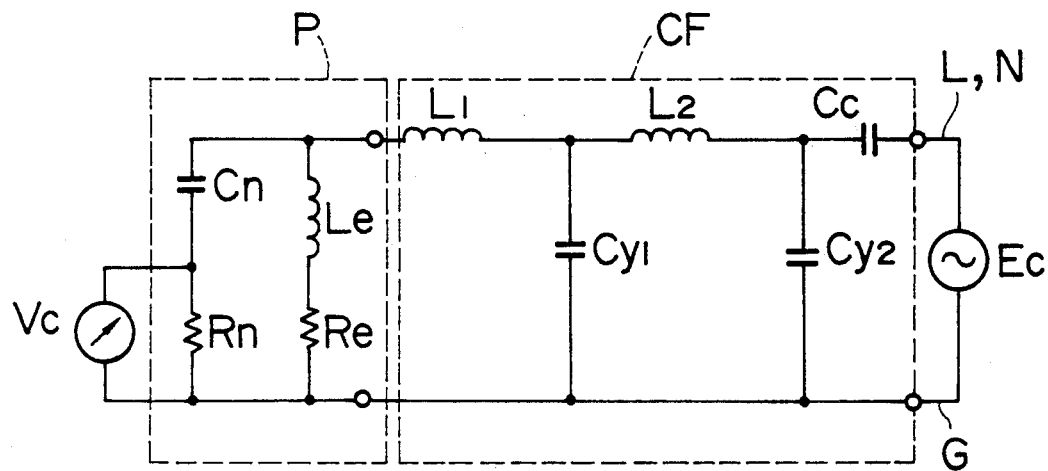
FIGS. 4 and 5 are an equivalent circuit diagrams in a case where the line filter operates as a common mode filter, where Y-capacitors are connected to the live line, the neutral line, and the ground line between the balun coil L1 and the balun coil L2 of FIG. 1.

FIG. 4 is an equivalent circuit diagram which illustrates a case where the line filter shown in FIG. 1, assuming that there are Y-capacitors connected to the live line, the neutral line, and the ground line between the balun coil L1 and the balun coil L2, operates to attenuate the common mode noise.

In the drawing, reference character P designates an equivalent circuit for the power supply source. Reference characters $R_e$ and $R_n$ designate an equivalent resistor, respectively, reference character $C_n$ designates an equivalent capacitance and reference character $L_e$ designates an equivalent inductance. Reference character CF designates an equivalent circuit for the common mode line filter. In addition, reference character $V_n$ designates a voltage of the common mode noise measured on the circuit for the power supply source. Further, reference character $E_n$ designates a voltage of the normal mode noise appearing on the load side.

Figure 5:
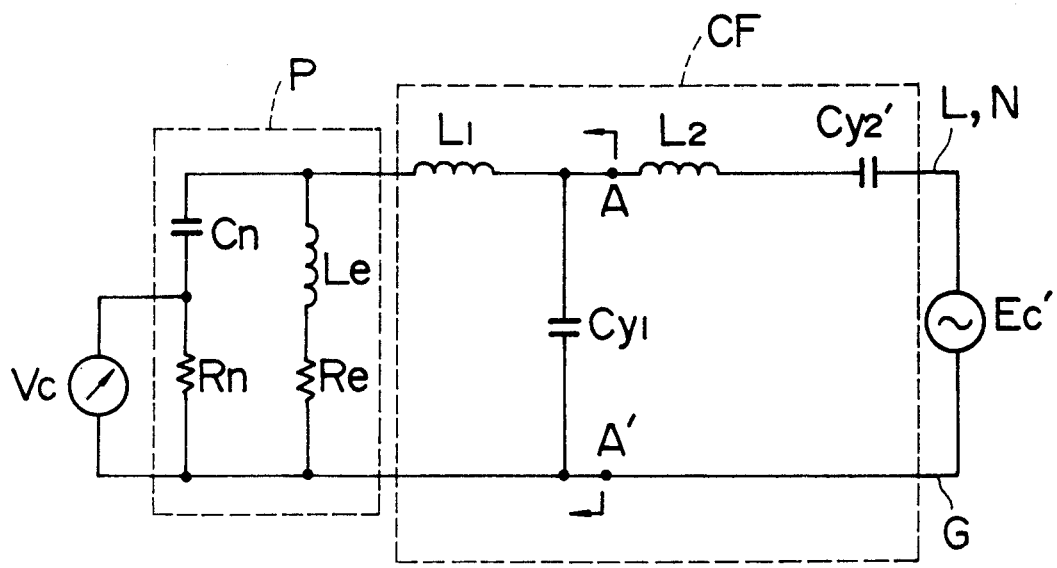

Since the equivalent circuit in FIG. 4 can be modified as shown in FIG. 5, the following description will be made with reference to FIGS. 4 and 5. Here, it should be noted that $E_c'$ is equal to $(C_c/C_{y2}').E_c$ and $C_{yC}'$ is equal to $C_{y2}+C_c$. When it is assumed that a minimum angular frequency of the noise to be attenuated is represented by $\omega_{min}$, it is required that conditions described in the following three paragraphs (1) to (3) are simultaneously satisfied in order to satisfactorily exhibit a capability of attenuating the noise.

(1) Since the resonance angular frequency $r_1$ caused by serial resonance of the balun coil L1 and the Y-capacitor $C_{y1}$ on the feed side of the power supply source should be smaller than $\omega_{min}$, it is required that the following inequality is established.

$$L1 \cdot C_{y1} > 1/(\omega_{min})^2$$

(2) When it is assumed that a composite impedance attributable to the balun coil L1 and the Y-capacitor $C_{y1}$ located leftward of points A and A' in FIG. 5 is represented by $Z_a$, the composite impedance $Z_a$ can be expressed by the following equation.

$$Z_a = j\omega L1/(1-\omega^1 \cdot L1 \cdot C_{y1})$$

Additionally, the composite impedance $Z_a$ may be expressed by the following equation with respect to an angular frequency $\omega$ which is much higher than the minimum angular frequency $\omega_{min}$.

$$Z_a = -j/\omega C_{y1}$$

In a case where the angular frequency $\omega$ is higher than the minimum angular frequency $\omega_{min}$, when the composite impedance $Z_a$ is shifted from $+j$ to $-J$, serial resonance is caused by the composite impedance $Z_a$ and the balun coil L2 at the next stage. Therefore, since the serial resonance angular frequency $\omega_{r2}$ should be lower than the minimum angular frequency $\omega_{min}$, it is required that the following inequality is established.

$$L2 \cdot C_{y1} > 1/(\omega_{min})^2$$

(3) Since a serial resonance angular frequency derived from the balun coil L2 and a composite capacitor $C_{y2}'$ composed of the Y-capacitor $C_{y1}$ and a coupling capacitor $C_c$ on the load side should be lower than the minimum angular frequency $\omega_{min}$, it is required that the following inequality is established.

$$L2 \cdot C_{y2}' > 1/(\omega_{min})^2$$

Here, it is assumed that a total inductance $LT_c$ is equal to $L1+L2$ and a total static capacitance $CT_c$ is equal to $C_{y1}+C_{y2}$.

As is apparent from the description of the paragraphs (1) and (2), the following inequality is established.

$$LtC \cdot C_{y1} > 2/(\omega_{min})^2$$

When it is supposed that L2 is equal to $\frac{1}{2}LT_c$, the following inequality is established based on the paragraph (3).

$$LtcC_{y2}' > 2/(\omega_{min})^2$$

Since the capacitance of the composite capacitor $C_{y2}$, is substantially equal to the capacitance of the capacitor $C_{y2}$, the following inequality is established.

$$LTc \cdot CTc > 2/(\omega_{min})^2$$

Since the total static capacitance $CT_c$ has an upper limit due to the restriction based on the leakage current, it can not practically be enlarged. For the reason, there is a need of enlarging the total inductance $LT_c$.

Therefore, the total inductance $LT_c$ is determined to satisfy the following inequality.

$$LTc > 2/CTc \cdot (\omega_{min})^2$$

In addition, a single stage type common mode filter corresponds to the common mode filter in the case where L1 is set to zero and $C_{y1}$ is set to zero in FIG. 5.

In this case, since the balun coil L2 has a total inductance, there arises a problem on the serial resonance which is caused by the total inductance $LT_c$ and the composite capacitor $C_{y2}'$.

Because of the foregoing problem, the following inequality is established.

$$LTc \cdot C_{y2}' > 1/(\omega_{min})^2$$

In a case where the line filter of the present invention is constructed in the single stage type, the Y-capacitor $C_{y2}$ only contributes to an occurrence of the leakage current. When it is assumed that a static capacitance of the Y-capacitor $C_{y2}$ is represented by $CT_2$, a capacitance of each of the capacitors $C_{y2}$ and $C_{y2}$ is substantially equal to the capacitance of $CT_c$.

Therefore, it is required that L2 is selected to satisfy the following inequality.

$$LTc > 1/CTc \cdot (\omega_{min})^2$$

As long as the angular frequency $\omega$ is much higher than the minimum angular frequency $\omega_{min}$, it has been found that the line filter constructed in the two-stage type can attenuate the noise by a larger quantity. However, as long as the angular frequency $\omega$ remains in the vicinity of the minimum angular frequency $\omega_{min}$, the following inequality is established with respect to the line filter constructed in the two-stage type.

$$LTc > 2/CTc \cdot (\omega_{min})^2$$

Additionally, the following inequality is established with respect to the line filter constructed in the single stage type.

$$LTc > 1/CTc \cdot (\omega_{min})^2$$

As is apparent from a comparison of the above two inequalities, it is advantageous that the common mode filter is constructed in the single stage type.

Specifically, in a case where there is few need of attenuating the common mode noise by a large quantity and the total inductance $LT_c$ is required to be small as far as possible, it is advantageous that the line filter is constructed in the single stage type. On the other hand, since the X-capacitor can be enlarged with respect to the normal mode noise, it is advantageous that the line filter is constructed in the two-stage type.

As will be apparent from the above description, it is recommendable that the line filter is constructed in the two-stage type in order to attenuate the normal mode noise, while it is constructed in the single stage type in order to attenuate the common mode noise.

Therefore, according to the present invention, it is possible to reduce a total quantity of inductance while effectively attenuating not only the normal mode noise but also the common mode noise. Additionally, it is possible to construct the line filter in smaller dimensions.

Figure 10:
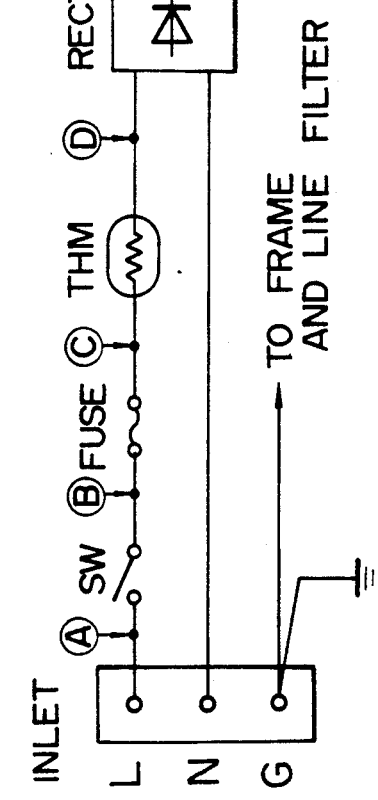
FIGS. 10, 11 and 12 are a circuit diagram which illustrates circuit arrangement in a case where the line filters of the present invention are dispersively arranged in an electronic device, respectively.

The main source where noise to be attenuated by the line filter appears is a switching circuit SC, as shown in FIG. 10. Therefore, in a case where the line filter of the present invention is arranged on the power line as shown in FIG. 10, the line filter may be arranged at any one of locations A to E in FIG. 10.

There may occur a case where a plurality of line filter are dispersively arranged at the respective locations A to E for the reasons of practical arrangement of an electronic device, effective attenuation of the noise or interference of radiative noise with the line filter. As far as a problem on the practical arrangement is concerned, the present invention makes it possible for a power supply source device or an electronic device to be freely designed to some extent particularly in respect of its configuration by dispersively arranging a plurality of line filters in the above-described manner.

Figure 11:
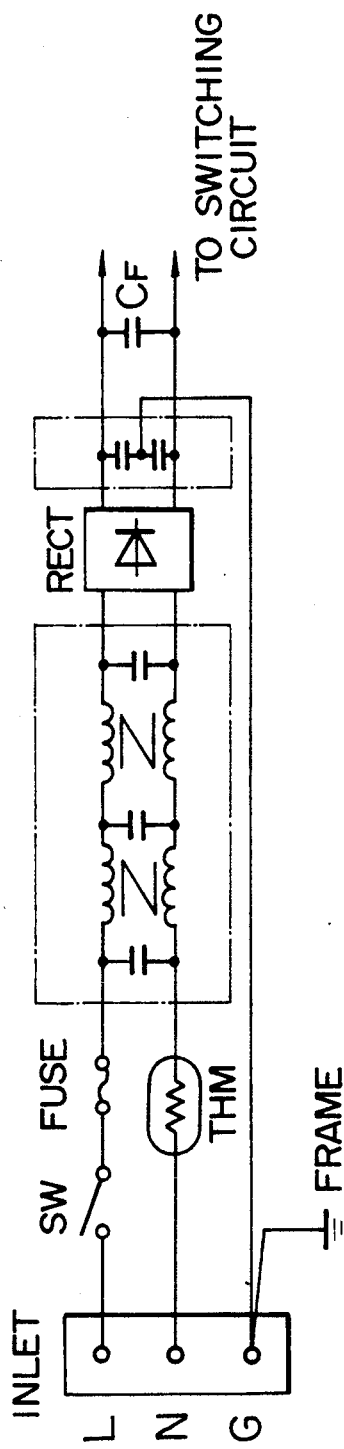

For example, FIG. 11 illustrates a case where a thermistor THM is displaced to the neutral line N side, a X-capacitor and a balun coil are arranged at the locations C and D and a Y-capacitor is arranged at the location E in FIG. 10.

Figure 12:
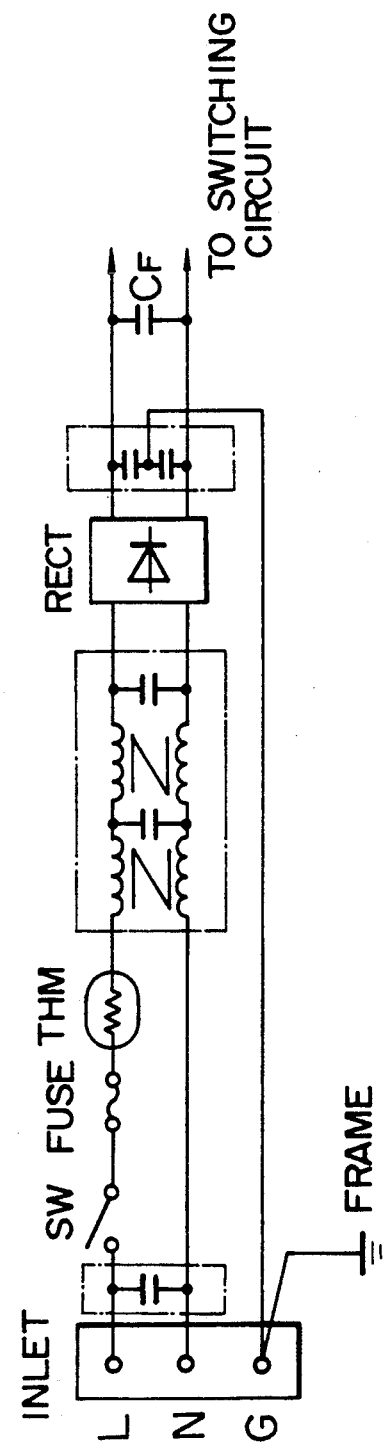

Next, FIG. 12 illustrates a case where a X-capacitor is arranged at the location A, another X-capacitor and a balun coil are arranged at the location D and a Y-capacitor is arranged at the location E in FIG. 10.

Figure 13:
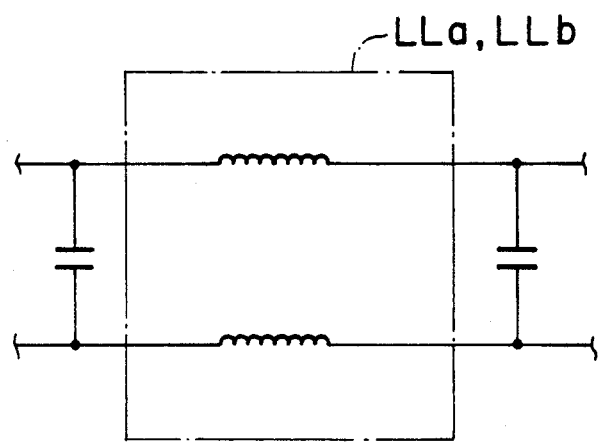
FIGS. 13 and 14 are a circuit diagram which schematically illustrates that an inductor can be divided into plural parts, respectively.
Figure 14:
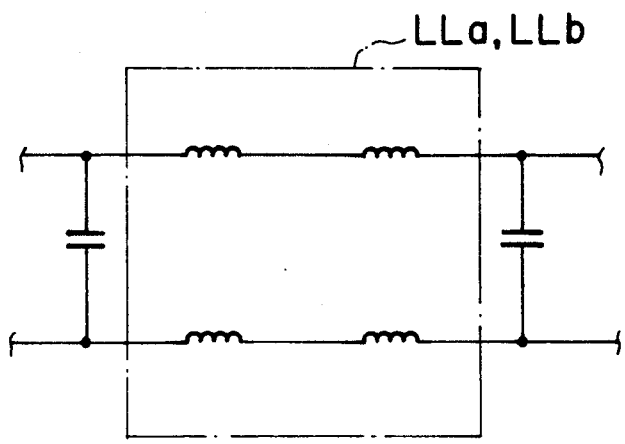

Additionally, the balun coil La and the balun coil Lb shown in FIG. 1 may be constructed as illustrated FIGS. 13 and FIG. 14, respectively. A combination can freely be selected among from plural divided balun coils with the same noise attenuating effect as that in the aforementioned embodiments of the present invention.

Further, the divisible range can be widened separately with respect to high frequency and low frequency.

While the present invention has been described above with respect to two preferred embodiments thereof, it should of course be understood that the present invention should not be limited only to these embodiments but various changes or modifications may be made without departure from the scope of the present invention as defined by the appended claims.

What is claimed is:

1. A power line filter for attenuating normal mode noise appearing on a power line between a live line and a neutral line as well as common mode noise appearing between said power line and a ground line comprising:
   a plurality of first inductors, at least one being disposed along said live line and at least one being disposed said neutral line,
   a first X-capacitor, interposed between said live line and said neutral line and a load side of said inductors,
   a plurality of second inductors, at least one being disposed along said live line and at least one being disposed along said neutral line on a load side of said first X-capacitor, and
   a first Y-capacitor, interposed between said live line and said ground line, and a second Y-capacitor, interposed between said neutral line and said ground line, on a load side of said first inductors; said first inductors, said second inductors, and said Y-capacitors constituting one common mode filter, and said first inductors, said first X-capacitor, and said second inductors constituting one normal mode filter.

2. A power line filter as claimed in claim 1, wherein said first inductors form a balun coil; inductance derived from leakage from said balun coil, said first X-capacitor, and said second inductors constituting one normal mode filter.

3. A power line filter as claimed in claim 1, wherein said second inductors form a balun coil; said first inductors, said first X-capacitor, and inductance derived from leakage from said balun coil constituting one normal mode filter.

4. A power line filter as claimed in claim 1, further comprising a second X-capacitor, interposed between said live line and said neutral line on a load side of said second inductors.

5. A power line filter as claimed in claim 1, wherein said power line filter includes means for arranging between an input terminal for the power line and a switching circuit.

6. A power line filter for attenuating normal mode noise appearing on a power line between a live line and a neutral line as well as common mode noise appearing between said power line and a ground line, comprising:
   a plurality of first inductors, at least one being disposed along said live line and at least one being disposed along said neutral line, wherein at least two of said first inductors form a balun coil and at least one of said first inductors comprises a choke coil,
   a first X-capacitor, interposed between said live line and said neutral line on a load side of said first inductors,
   a plurality of second inductors, at least one being disposed along said live line and at least one being disposed along said neutral line on a load side of said first X-capacitor, and
   a first Y-capacitor, interposed between said live line and said ground line, and a second Y-capacitor, interposed between said neutral line and said ground line, on a load side of said second inductors; said balun coil, said second inductors, and said Y-capacitors constituting one common mode filter, and said choke coil, said first X-capacitor, and said second inductors constituting one normal mode filter.

7. A power line filter as in claim 6, wherein said second inductors form a second balun coil; said choke coil, said first X-capacitor, and inductance derived from leakage from said second balun coil constituting one normal mode filter.

8. A power line filter as in claim 6, wherein at least two of said second inductors form a second balun coil and at least one of said second inductors comprises a second choke coil.

9. A power line filter for attenuating normal mode noise appearing on a power line between a live line and a neutral line as well as common mode noise appearing between said power line and a ground line, comprising:
   a plurality of first inductors, at least one being disposed along said live line and at least one being disposed along said neutral line,
   a first X-capacitor, interposed between said live line and said neutral line on a load side of said first inductors,
   a plurality of second inductors, at least one being disposed along said live line and at least on being disposed along said neutral line on a load side of said first X-capacitor, wherein at least two of second inductors form a balun coil and at least one of said second inductors comprises a choke coil, and
   a first Y-capacitor, interposed between said live line and said ground line, and a second Y-capacitor, interposed between said neutral line and said ground line, on a load side of said second inductors; said first inductors, said balun coil, and said Y-capacitors constituting one common mode filter, and said first inductors, said first X-capacitor, and said choke coil constituting one normal mode filter.

10. A power line filter as in claim 9, wherein said first inductors form a first balun coil, inductance derived from leakage from said first balun coil, said first X-capacitor, and said choke coil constituting one normal mode filter.

11. A power line filter for attenuating normal mode noise appearing on a power line between a live line and a neutral line as well as common mode noise appearing between said power line and a ground line, comprising:
   a first X-capacitor, interposed between said live line and said neutral line,
   a plurality of first inductors, at least one being disposed along said live line and at least one being disposed along said neutral line on a load side of said first X-capacitor,
   a second X-capacitor, interposed between said live line and said neutral line on a load side of said first inductors,
   a plurality of second inductors, at least one being disposed along said live line and at least one being disposed along said neutral line on a load side of said second X-capacitor, and
   a first Y-capacitor, interposed between said live line and said ground line, and a second Y-capacitor, interposed between said neutral line and said ground line, on a load side of said second inductors;

said first inductors, said second inductors, and said Y-capacitors constituting one common mode filter, and said first X-capacitor, said first inductors, said second X-capacitor, and said second inductors constituting one normal mode filter.

12. A power line filter as claimed in claim 11, wherein at least two of said first inductors form a balun coil and at least one of said first inductors comprises a choke coil.

13. A power line filter as claimed in claim 11, wherein at least two of said second inductors form a balun coil and at least one of said second inductors comprises a choke coil.

14. A power line filter as claimed in claim 11, further comprising a third X-capacitor, interposed between said live line and said neutral line on a load side of said second inductors.

15. A power line filter as claimed in claim 11, wherein said power line filter includes means for arranging between an input terminal for the power line and a switching circuit.

16. A power line filter as claimed in claim 11, wherein said first inductors form a balun coil; said first X-capacitor, inductance derived from leakage from said balun coil, said second X-capacitor, and said second inductors constituting one normal mode filter.

17. A power line filter as claimed in claim 11, wherein said second inductors form a balun coil; said first X-capacitor, said first inductors, said second X-capacitor, and inductance derived from leakage from said balun coil constituting one normal mode filter.

18. A power line filter as claimed in claim 1, wherein said first inductors form a first balun coil and said second inductors form a second balun coil, said first X-capacitor, inductance derived from leakage from said first balun coil, said second X-capacitor, and inductance derived from leakage from said second balun coil constituting one normal mode filter.

19. A power line filter as in claim 18, further comprising a third X-capacitor which is interposed between said live line and said neutral line on a load side of said second balun coil.

20. A power line filter as in claim 18 or 19, further comprising a choke coil which is arranged on said live line and said neutral line between said first X-capacitor and said first balun coil.

21. A power line filter as in claim 18 or 19, further comprising a choke coil which is arranged on said live line and said neutral line between said second balun coil and said second X-capacitor.

22. A power line filter as in claim 18 or 19, further comprising a choke coil which is arranged on said live line and said neutral line between said first X-capacitor and said first balun coil, and a choke coil which is arranged on said live line and said neutral line between said second balun coil and said second X-capacitor.

23. A power line filter as claimed in claim 4, wherein said first inductors form a balun coil; inductance derived from leakage from said balun coil, said first X-capacitor, and said second inductors constituting one normal mode filter.

24. A power line filter as claimed in claim 4, wherein said second inductors form a balun coil; said first inductors, said first X-capacitor, and inductance derived from leakage from said balun coil constituting one normal mode filter.

25. A power line filter as claimed in claim 6, further comprising a second X-capacitor, interposed between said live line and said neutral line on a load side of said second inductors.

26. A power line filter as claimed in claim 9, further comprising a second X-capacitor, interposed between said live line and said neutral line on a load side of said second inductors.

27. A power line filter as claimed in claim 10, further comprising a second X-capacitor, interposed between said live line and said neutral line on a load side of said second inductors.

28. A power line filter as claimed in claim 7, further comprising a second X-capacitor, interposed between said live line and said neutral line on a load side of said second inductors.

29. A power line filter as claimed in claim 8, further comprising a second X-capacitor, interposed between said live line and said neutral line on a load side of said second inductors.

30. A power line filter as claimed in claim 14, wherein said second inductors form a balun coil; said first X-capacitor, said first inductors, said second X-capacitor, and inductance derived from leakage from said balun coil constituting one normal mode filter.

31. A power line filter as claimed in claim 13, further comprising a third X-capacitor, interposed between said live line and said neutral line on a load side of said second inductors.

32. A power line filter as claimed in claim 14, wherein said first inductors form a balun coil; said first X-capacitor, inductance derived from leakage from said balun coil, said second X-capacitor, and said second inductors constituting one normal mode filter.

33. A power line filter as claimed in claim 12, further comprising a third X-capacitor, interposed between said live line and said neutral line on a load side of said second inductors.

* * * * *

UNITED STATES PATENT AND TRADEMARK OFFICE
CERTIFICATE OF CORRECTION

PATENT NO. : 5,179,362
DATED : January 12, 1993
INVENTOR(S) : OKOCHI, et al.

It is certified that error appears in the above-identified patent and that said Letters Patent is hereby corrected as shown below:

IN THE CLAIMS:

Column 7, line 28 change "first" to --second--.

Signed and Sealed this

Eighteenth Day of January, 1994

Attest:

BRUCE LEHMAN

Attesting Officer　　Commissioner of Patents and Trademarks